United States Patent
Zhao et al.

(10) Patent No.: US 8,469,830 B2
(45) Date of Patent: Jun. 25, 2013

(54) UNIVERSAL JOINT

(75) Inventors: Zhi-Ming Zhao, Shenzhen (CN); Guo-Qing Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 70 days.

(21) Appl. No.: 13/185,305

(22) Filed: Jul. 18, 2011

(65) Prior Publication Data
US 2012/0135811 A1 May 31, 2012

(30) Foreign Application Priority Data
Nov. 30, 2010 (CN) .......................... 2010 1 0565789

(51) Int. Cl.
*F16D 3/26* (2006.01)

(52) U.S. Cl.
USPC .......................................... 464/151; 403/220

(58) Field of Classification Search
USPC ....... 901/29; 464/106, 147, 151, 87; 411/544; 403/220
See application file for complete search history.

(56) References Cited

U.S. PATENT DOCUMENTS

| | | | | | |
|---|---|---|---|---|---|
| 2,277,443 | A | * | 3/1942 | Livingston | 411/544 X |
| 2,641,115 | A | * | 6/1953 | Garrison | 464/151 |
| 2,773,365 | A | * | 12/1956 | Delf et al. | 403/220 X |
| 3,549,183 | A | * | 12/1970 | Smollinger | 403/220 X |
| 6,755,363 | B2 | * | 6/2004 | Weatherl et al. | 464/151 X |

FOREIGN PATENT DOCUMENTS

GB 418541 * 10/1934 ..................... 464/151

OTHER PUBLICATIONS

Shigley et al, Mechanical Engineering Design, fourth edition, New York, McGraw-Hill Book Co., 1983, p. 357.*

* cited by examiner

*Primary Examiner* — Gregory Binda
(74) *Attorney, Agent, or Firm* — Altis Law Group, Inc.

(57) ABSTRACT

A universal joint includes a pivotal member and two connecting assemblies. The two connecting assemblies are assembled to two ends of the pivotal member, respectively, such that the two connecting assemblies are rotatably assembled together via the pivotal member. The pivotal member defines four arc-shaped pivotal slots spaced to each other at an outer periphery thereof. Each connecting assembly includes two connecting members respectively assembled to the two symmetrical pivotal slots of the pivotal member, and are positioned at a same end of the pivotal member.

7 Claims, 2 Drawing Sheets

UNIVERSAL JOINT

BACKGROUND

1. Technical Field

The present disclosure relates to joint structures, and particularly, to a universal joint.

2. Description of Related Art

Generally, a common universal joint has only two degrees of freedom, and includes two transmission blocks and a cross axle connecting with the two transmission blocks. However, in some complicated and multi-degree-of-freedom mechanisms such as industrial robots, the multi-degree-of-freedom universal joints are needed to connect and control the robot arms to fulfill complicated movements or operations. Moreover, the common universal joint has a poor performance and the cross axle of the common universal joint is easily worn out in use.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present disclosure. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
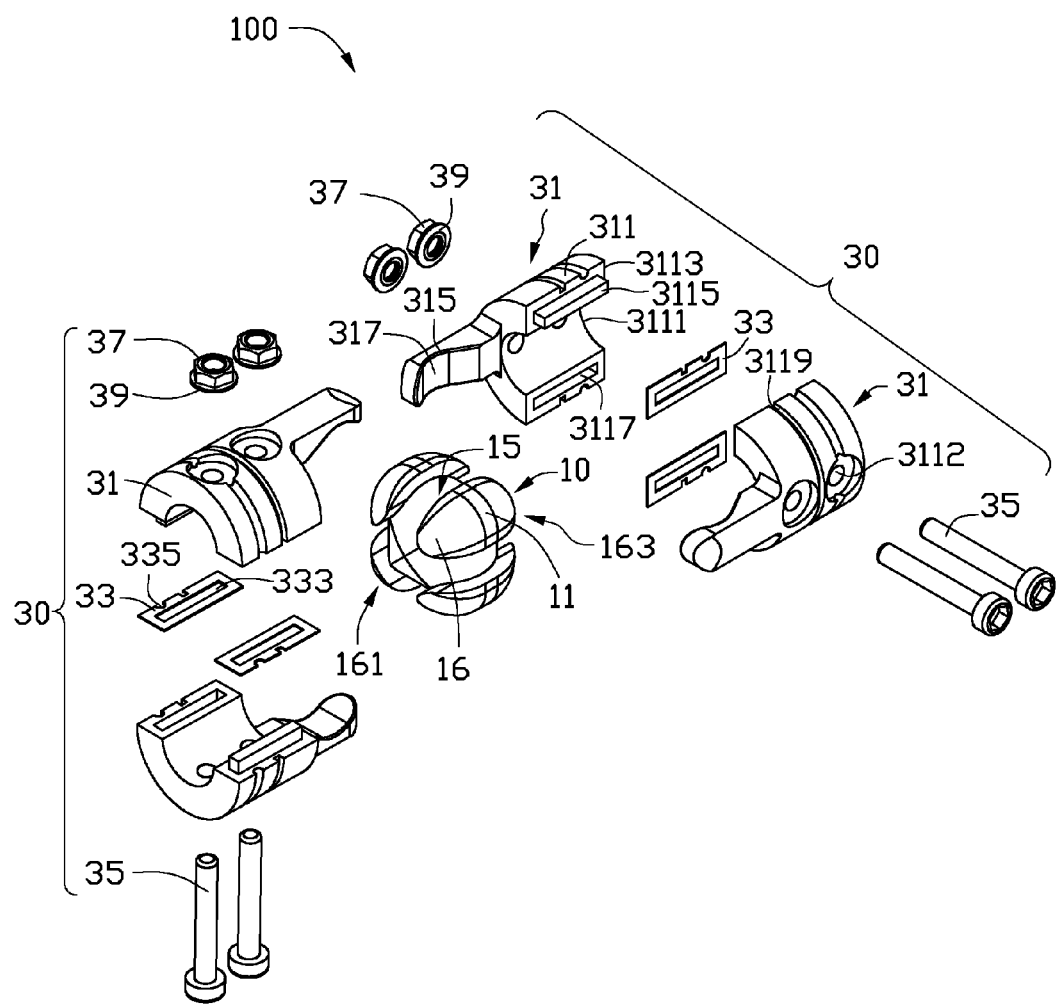
FIG. 1 is an exploded, isometric view of an embodiment of a universal joint.
Figure 2:
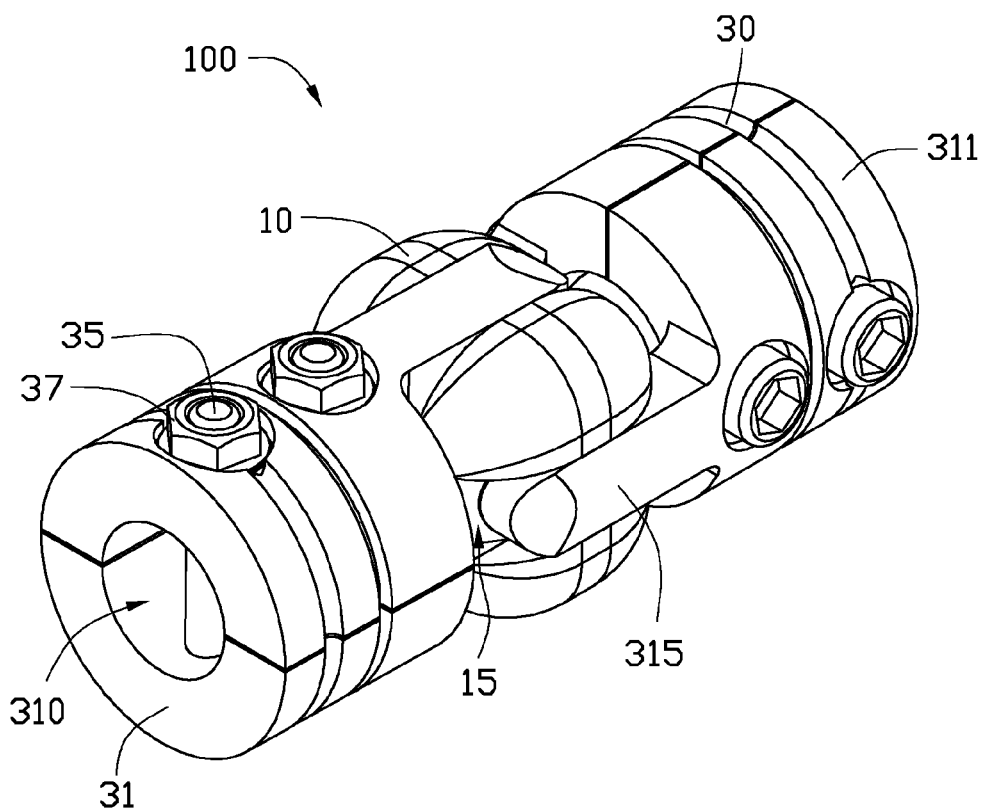
FIG. 2 is an assembled, isometric view of the universal joint of FIG. 1.

Referring to FIGS. 1 and 2, an embodiment of a universal joint 100 is shown. The universal joint 100 includes a pivotal member 10 and two connecting assemblies 30 rotatably mounted together via the pivotal member 10. In the illustrated embodiment, the pivotal member 10 is substantially ball-shaped, and includes a cylindrical main portion 11 and two hemispherical pivotal portions 16 oppositely formed at two ends of the main portion 11. Four arc-shaped pivotal slots 15 are symmetrically defined in an outer periphery of the pivotal member 10, thereby forming four spaced arc-shaped engaging bottom surfaces (not labeled) on the bottom of the four pivotal slots 15, respectively. Each pivotal slot 15 extends from a distal end 161 of one pivotal portion 16, and passes through the main portion 11, and finally reaches to a distal end 163 of the other pivotal portion 16. Four pivotal slots 15 intersect with each other at the distal end 161, and intersect with each other at the distal end 163.

The two connecting assemblies 30 are rotatably assembled to two ends of the pivotal member 10, respectively. Each connecting assembly 30 includes two connecting members 31, two elastic pads 33, at least one bolt 35, at least one nut 37, and at least one elastic washer 39. The two connecting members 31 are oppositely assembled together by means of the at least one bolt 35, the at least one nut 37, and the at least one elastic washer 39, and are further rotatably engaged into two opposite pivotal slots 15 of the pivotal member 10, respectively. The two elastic pads 33 are sandwiched between the two connecting members 31. In the illustrated embodiment, there are two bolts 35, two nuts 37 and two elastic washers 39.

Each connecting member 31 includes a gripping base 311 and a pivotal arm 315 extending from one end of the gripping base 311. The gripping base 311 is substantially hollow semi-cylindrical, and includes an arc-shaped domed portion 3111 and two peripheral end portions 3113. At least one mounting hole 3112 is defined through the domed portion 3111 of the gripping base 311. In the illustrated embodiment, there are two mounting holes 3112 separately defined through the domed portion 3111 of the connecting member 31. A latching block 3115 is formed on one end portion 3113 of the gripping base 311. A latching slot 3117 is defined in the other end portion 3113 of the gripping base 311, and has a shape and dimension matching with the corresponding latching block 3115. When the two connecting members 31 are assembled together, the latching block 3115 and the latching slot 3117 of one connecting member 31 are latched with the latching slot 3117 and the latching block 3115 of the other connecting member 31, respectively. The gripping base 311 further includes two semicircular-shaped positioning slots 3119 separately defined in an outer periphery thereof.

The pivotal arm 315 is substantially bar-shaped, and extends out from one end of the gripping base 311 axially, corresponding to the arc-shaped pivotal slots 15 of the pivotal member 10. An arc-shaped engaging slot 317 is recessed from an inner surface of the pivotal arm 315 and positioned adjacent to the distal end of the pivotal arm 315, for engaging with the engaging bottom surfaces of the four pivotal slots 15 of the pivotal member 10.

The two elastic pads 33 are both substantially rectangular sheet shaped, and each elastic pad 33 has a shape and dimensions substantially the same as that of the end portion 3113 of the gripping base 311, such that, when the two connecting members 31 are assembled together, the two elastic pads 33 are sandwiched between the two end portions 3113 of the gripping bases 311 of the two connecting members 31, respectively. Each elastic pad 33 defines a through hole 333 corresponding to the latching block 3115 and the latching slot 3117 of the connecting member 31. Two openings 335 are separately defined through each elastic pad 33 and positioned adjacent to one edge of the elastic pad 33, corresponding to the two positioning slots 3119 of the connecting member 31.

When assembling the universal joint 100, the two pivotal arms 315 of the two connecting members 31 are oppositely inserted into and rotatably engaged with two symmetrical pivotal slots 15 of the pivotal member 10, the two gripping bases 311 of the two connecting members 31 are detachably assembled together, and together form a substantially cylindrical assembling hole 310 there between. A bottom surface of the engaging slot 317 of each pivotal arm 315 rotatably engages with the engaging bottom surface of one corresponding pivotal slot 15 of the pivotal member 10. The two elastic pads 33 are respectively sleeved on the latching blocks 3115 of the two connecting member 31. The latching block 3115 and the latching slot 3117 of one connecting member 31 align with and respectively latch with the latching slot 3117 and the latching block 3115 of the other connecting member 31 to assemble the two connecting members 31 together. Thus, the two elastic pads 33 are sandwiched between the two end portions 3113 of the gripping base 311 of the two connecting members 31, respectively. The two bolts 35 pass through the two mounting holes 3112 of the connecting member 31, and are exposed out from the two mounting holes 3112 of the other connecting member 31. The two nuts 37 together with the two elastic washers 39 are respectively screwed onto the distal ends of the two bolts 35 to fix the two connecting members 31 together. The other two connecting members 31 are rotatably assembled with the other two symmetrical pivotal slots 15 of the pivotal member 10, and positioned at the other end of the pivotal member 10 oppositely, to finish the assembly of the universal joint 100. The two connecting assemblies 30 are then respectively rotatably assembled to two ends of the pivotal member 10.

The universal joint 100 has a simpler structure and improved performance. As the two connecting assemblies 30 are rotatably assembled together by the pivotal member 10, to replace the typical conventional cross axle, the contact areas between the two connecting assemblies 30 and the pivotal member 10 are increased, such that, the two connecting assemblies 30 can steadily rotate with each other. In addition, the two connecting assemblies 30 of the universal joint 100 can be rotated to form a plurality of different angles and be timely stopped at a preset position, during usage, by the pivotal member 10.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A universal joint, comprising:
a pivotal member symmetrically defining four arc-shaped pivotal slots in an outer periphery thereof, the pivotal member being substantially ball shaped, and comprising a cylindrical main portion and two hemispherical pivotal portions oppositely formed at two ends of the main portion, four pivotal slots symmetrically defined in an outer periphery of the pivotal member, each pivotal slot extending from a distal end of one pivotal portion, and passing through the main portion, and finally reaching to a distal end of the other pivotal portion, four pivotal slots intersecting with each other at the distal ends of one pivotal portion, and intersecting with each other at the distal end of the other pivotal portion; and
two connecting assemblies rotatably mounted together by the pivotal member and positioned at two ends of the pivotal member, each connecting assembly comprising:
two connecting members engaging with the two symmetrical pivotal slots of the pivotal member, respectively, and oppositely positioned at a same end of the pivotal member, the connecting members rotatably engaging with the corresponding pivotal slot of the pivotal member, each connecting member comprising:
a gripping base being substantially hollow semi-cylindrical, and comprising an arc-shaped domed portion and two peripheral end portions, the two gripping bases of the two connecting members detachably assembled together, and together form a substantially cylindrical assembling hole therebetween,
a pivotal arm being substantially bar-shaped, and extending out from one end of the gripping base axially, and
a latching block formed on one end portion of the gripping base, a latching slot defined in the other end portion of the gripping base, when the two connecting members assembled together, the latching block and the latching slot of one connecting member respectively latching with the latching slot and the latching block of the other connecting member; and
two elastic pads placed on and sandwiched between the two end portions of the gripping bases of the two connecting members, respectively.

2. The universal joint of claim 1, wherein each pivotal slot forms an arc-shaped bottom surface, the pivotal arm defines an arc-shaped engaging slot rotatably engaging with the bottom surface of the pivotal slot of the pivotal member.

3. The universal joint of claim 1, wherein the gripping base of each connecting member defines at least one mounting hole through the domed portion thereof; each connecting assembly further comprises at least one bolt and at least one nut, the at least one bolt passes through the at least one mounting hole of one connecting member, and are exposed from the at least one mounting hole of the other connecting member of the connecting assembly; the at least one nut is screwed onto the distal end of the at least one bolt to assemble the two connecting member together.

4. The universal joint of claim 3, wherein each connecting assembly further comprises at least one elastic washer, and the elastic washer is assembled to the distal end of the at least one bolt together with the at least one nut.

5. The universal joint of claim 1, wherein the gripping base further comprises two semicircular shaped positioning slots separately defined in an outer periphery thereof.

6. A universal joint, comprising:
a spherical pivotal member comprising four arc-shaped pivotal slots separately defined in an outer periphery thereof; and
two connecting assemblies rotatably mounted to the pivotal member, and positioned at two ends of the pivotal member; each connecting assembly comprising two connecting members and two elastic pads, the two connecting members assembled together and two pivotal arms respectively formed on the two connecting members and rotatably engaging with two pivotal slots of the pivotal member, each connecting member comprising a gripping base, the gripping base being substantially hollow semi-cylindrical, and comprising an arc-shaped domed portion and two peripheral end portions; the pivotal arm being substantially bar shaped, and extending out from one end of the gripping base axially; the two gripping bases of the two connecting members together forming a substantially cylindrical assembling hole therebetween as the two connecting members assembled together, each connecting member further comprising a latching block formed on one end portion of the gripping base, and a latching slot defined in the other end portion of the gripping base, the latching block and the latching slot of one connecting member respectively latching with the latching slot and the latching block of the other connecting member, the two elastic pads are placed on and sandwiched between the two end portions of the gripping base of the two connecting members, respectively.

7. The universal joint of claim 6, wherein the pivotal member comprises a cylindrical main portion and two hemispherical pivotal portions oppositely formed at two ends of the main portion; each pivotal slot extends from a distal end of one pivotal portion, and passes through the main portion, and finally reaches to a distal end of the other pivotal portion, four pivotal slots intersect with each other at the distal end of one pivotal portion, and intersect with each other at the distal end of the other pivotal portion.

* * * * *